United States Patent
Ko

(10) Patent No.: US 12,494,090 B2
(45) Date of Patent: Dec. 9, 2025

(54) VEHICLE AND CONTROL METHOD FOR MONITORING A STATE OF THE VEHICLE BATTERY

(71) Applicants: HYUNDAI MOTOR COMPANY, Seoul (KR); KIA CORPORATION, Seoul (KR)

(72) Inventor: Jaeyoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 321 days.

(21) Appl. No.: 18/081,066

(22) Filed: Dec. 14, 2022

(65) Prior Publication Data
US 2023/0386262 A1    Nov. 30, 2023

(30) Foreign Application Priority Data
May 26, 2022    (KR) .................... 10-2022-0064875

(51) Int. Cl.
G07C 5/00    (2006.01)
G07C 5/10    (2006.01)

(52) U.S. Cl.
CPC .............. G07C 5/008 (2013.01); G07C 5/10 (2013.01)

(58) Field of Classification Search
CPC ... B60R 16/0315; B60R 25/24; B60R 25/102; B60W 40/08; B60W 50/14; G08B 21/02; G08C 17/02; G06Q 10/02; G06Q 50/40; G07C 5/008; G07C 5/10; H04L 9/32; H04L 12/12; H04L 67/12; H04W 4/40; H04W 36/0022; H04W 52/0277; H04W 88/06

USPC ...................................................... 340/425.5
See application file for complete search history.

(56) References Cited

U.S. PATENT DOCUMENTS

| | | | | |
|---|---|---|---|---|
| 3,325,783 | A * | 6/1967 | Webb ..................... | B60Q 9/001 315/82 |
| 10,096,176 | B1 * | 10/2018 | Namineni .............. | G07C 5/008 |
| 2010/0123565 | A1 * | 5/2010 | Kaufman ............... | G07C 5/008 340/426.24 |
| 2011/0082621 | A1 * | 4/2011 | Berkobin ............... | B60L 58/16 701/31.4 |
| 2014/0176085 | A1 | 6/2014 | Maruno et al. | |
| 2014/0210638 | A1 * | 7/2014 | Gussen ................... | B60L 58/14 340/870.09 |
| 2014/0279707 | A1 * | 9/2014 | Joshua ............... | G06Q 30/0283 701/1 |

(Continued)

FOREIGN PATENT DOCUMENTS

| JP | 6682452 | B2 | 4/2020 |
|---|---|---|---|
| KR | 10-2005-0046223 | A | 5/2005 |

(Continued)

*Primary Examiner* — Stephen R Burgdorf
(74) *Attorney, Agent, or Firm* — Morgan, Lewis & Bockius LLP

(57) ABSTRACT

In a vehicle and control method thereof, the vehicle includes a sensor acquiring state information of the vehicle, a telematics terminal communicating with a server, and a controller including a processor processing the state information, wherein the controller may identify driver's getting-off state of the vehicle based on processing the state information, determine use state of a battery of the vehicle in response to identifying the driver's getting-off state, and generate a control signal to transmit a warning message to a driver terminal based on the use state of the battery.

16 Claims, 7 Drawing Sheets

(56) References Cited

U.S. PATENT DOCUMENTS

| | | | |
|---|---|---|---|
| 2015/0017955 A1* | 1/2015 | Canto Fuertes | H04Q 3/72 |
| | | | 455/414.1 |
| 2015/0382160 A1* | 12/2015 | Slay, Jr. | H04W 4/029 |
| | | | 455/466 |
| 2016/0205146 A1* | 7/2016 | Sugioka | G05D 1/0291 |
| | | | 709/204 |
| 2017/0206139 A1 | 7/2017 | Braun et al. | |
| 2019/0362566 A1* | 11/2019 | Mattern | G01M 17/00 |
| 2020/0090425 A1* | 3/2020 | Senft-Grupp | G01R 31/3648 |
| 2020/0139845 A1 | 5/2020 | Henrichs et al. | |
| 2020/0286310 A1* | 9/2020 | Carver | G07C 5/0816 |
| 2021/0049840 A1 | 2/2021 | Moghtadai et al. | |
| 2021/0315034 A1* | 10/2021 | Wang | H04W 4/40 |
| 2022/0398872 A1* | 12/2022 | Udipi | G06Q 10/06 |

FOREIGN PATENT DOCUMENTS

| | | |
|---|---|---|
| KR | 10-1743233 B1 | 6/2017 |
| KR | 10-2020-0029402 A | 3/2020 |

\* cited by examiner

VEHICLE AND CONTROL METHOD FOR MONITORING A STATE OF THE VEHICLE BATTERY

CROSS-REFERENCE TO RELATED APPLICATION(S)

This application claims the benefit of priority to Korean Patent Application No. 10-2022-0064875, filed on May 26, 2022 in the Korean Intellectual Property Office, the disclosure of which is incorporated herein by reference.

TECHNICAL FIELD

The present disclosure relates to a vehicle and a control method thereof, and more particularly, to a vehicle and a control method for generating a battery discharge-preventive alarm using a telematics terminal.

BACKGROUND

With the recent development of vehicle information technology (IT), vehicles equipped with a telematics terminal are increasing in number.

Telematics is a term that combines telecommunication and informatics, and is defined as a next-generation information provision service for vehicles through the combination of the IT industry and the automobile industry.

The in-vehicle telematics service combines mobile communication technology and global positioning system (GPS) with the vehicle to provide drivers in real time with vehicle accident or theft detection, driving route guidance, traffic and living information, remote vehicle diagnostic services, financial services, and games.

The telematics terminal may transmit and receive various data by performing Internet communication over a wireless communication network with a server providing telematics services, performing short message service (SMS) communication via an SMS number, and performing Voice Over IP (VoIP) telephony.

Although designed to transmit a warning message to the driver's terminal to inform of a problematic situation of the vehicle, the existing telematics terminal or a vehicle equipped with such a telematics terminal lack a means to call the attention of the driver busy in other thing or missed checking the warning message, resulting in serious problem such as battery discharge.

SUMMARY

The present disclosure provides a vehicle and a control method thereof that is capable of providing a means for calling the attention of the driver who receives a warning message but does not respond to the warning message.

In order to achieve the above object, a vehicle according to an embodiment includes a sensor acquiring state information of the vehicle, a telematics terminal communicating with a server, and a controller including a processor processing the state information, wherein the controller may identify driver's getting-off state of the vehicle based on processing the state information, determine use state of a battery of the vehicle in response to identifying the driver's getting-off state, and generate a control signal to transmit a first warning message to a driver terminal based on the use state of the battery.

The controller may identify an expected discharge time of the battery based on the use state of the battery and generate a control signal to contact the driver terminal in response to the use state not being changed before a time predetermined based on the expected discharge time.

The controller may generate a control signal to transmit a second warning message to a predetermined terminal in response to failure of receipt of a response from the driver terminal within a predetermined time.

The controller may request history information of the vehicle from the server in response to failure of receipt of a response from the driver terminal within a predetermined time, identify a first user terminal based on processing the history information, and generate a control signal to transmit a third warning message to the identified first user terminal.

The controller may generate, in response to receipt of a response to the third warning message, a control signal corresponding to the response.

The third warning message may be a warning message about at least one of tail lamp on-state, emergency lamp on-state, and ignition on-state.

The controller may identify a second user terminal in response to failure of receipt of a response from the first user terminal within the predetermined time and generate a control signal to transmit a fourth warning message to the identified second user terminal.

Identifying of the first user terminal may include indenting the first user terminal based on at least one of a number of locations sharing times of the vehicle and a number of smart key sharing times of the vehicle via the telematics terminal among terminal information included in the history information.

Identifying of the second user terminal may include identifying the second user terminal based on a number of Bluetooth connections to the vehicle among terminal information included in the history information.

The controller may request history information of the vehicle from the server, identify driver propensity information based on the history information of the vehicle, and generate a control signal corresponding to the use state of the battery based on the identified driver propensity information.

In order to achieve the above object, a telematics terminal according to an embodiment includes a communication module communicating with a server, a memory storing software for controlling the communication module, and a processor controlling the communication module based on the software stored in the memory, identifying driver's getting-off state of the vehicle based on processing a state information, determining use state of a battery of the vehicle in response to identifying the driver's getting-off state, and generating a control signal to control the communication module to transmit a warning message to a driver terminal based on the use state of the battery.

In order to achieve the above object, a vehicle control method according to an embodiment may including acquiring, by a sensor, state information of a vehicle, identifying, by a controller, driver's getting-off state of the vehicle based on processing the state information, determining, by the controller, battery use state of the vehicle in response to identifying the driver's getting-off state of the vehicle, and transmitting, by the controller, a first warning message to a driver terminal based on the battery use state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
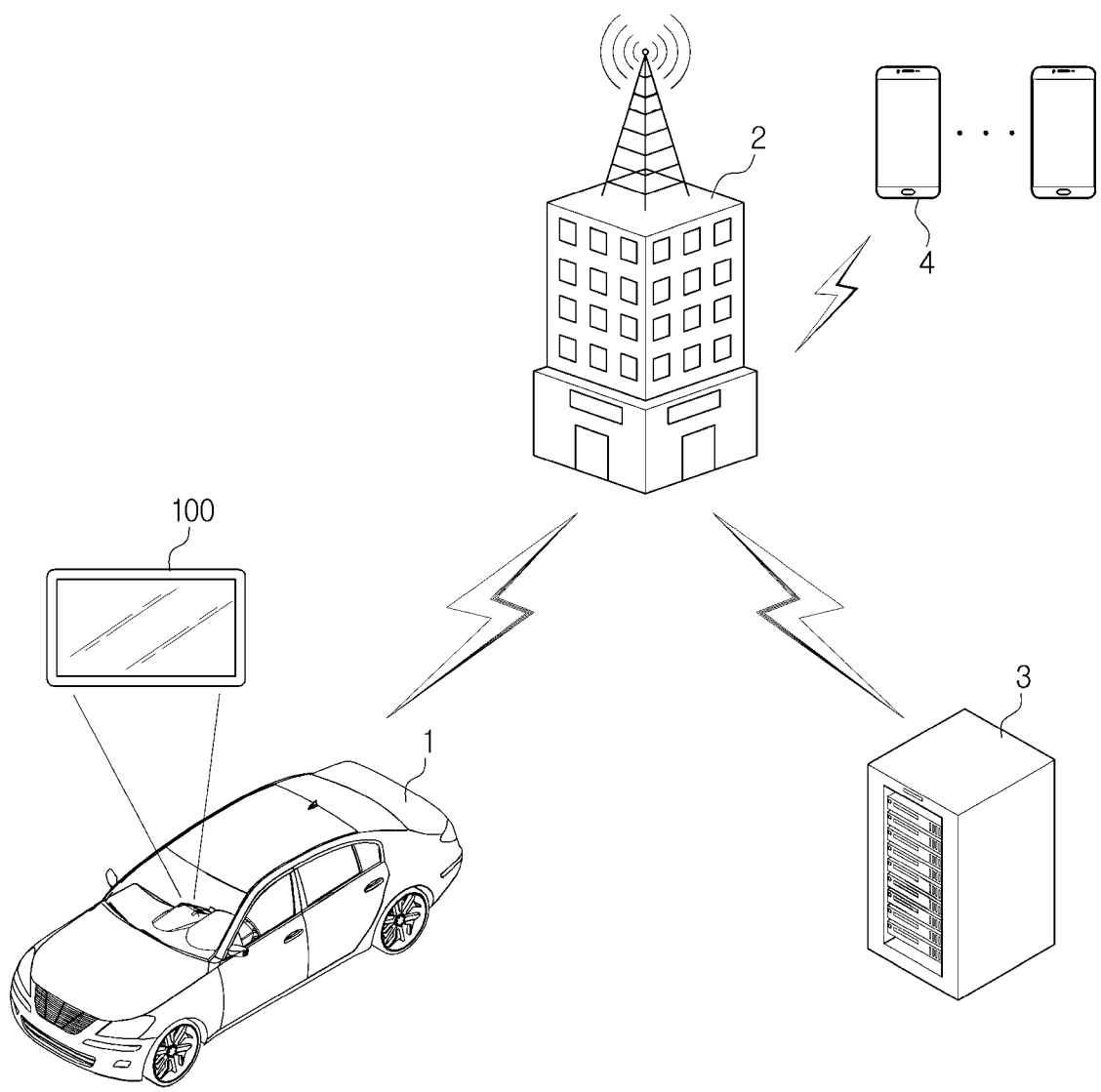
FIG. 1 illustrates a situation in which a base station supports Internet communication according to an embodiment of the present application.

Advantages and features of the present disclosure and methods and apparatuses of accomplishing the same may be understood more readily by reference to the following detailed description of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the present disclosure will only be defined by the appended claims and their equivalents.

The terms used in the disclosed specification are briefly defined first to describe the present disclosure in detail.

Although the terms used in the disclosure are selected, as much as possible, from general terms that are widely used at present while taking into consideration of the functions in the disclosure, these terms may be replaced by other terms based on intentions of those skilled in the art, customs, advent of new technologies, or the like. In addition, in a particular case, terms that are arbitrarily selected by the applicant of the disclosure may be used and, in this case, the meanings of these terms may be described in corresponding description parts of the disclosure. Accordingly, the terms used in the disclosure should be construed on the basis of the practical meanings thereof and the overall content of the disclosure rather than being simply construed based on names of the terms.

Also, when a part is said to "comprise" a certain component, this means that other components may be further included instead of excluding other components unless specifically stated otherwise. In addition, the term "module" used in the specification means a software or hardware component such as a Field Programmable Gate Array (FPGA) or Application Specific Integrated Circuit (ASIC), which performs certain tasks. However, the term "module" is not limited to software or hardware. A module may advantageously be configured to reside on the addressable storage medium or configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules.

Hereinafter, embodiments of a fingerprint authentication diagnosis system and a fingerprint data initialization method will be described in detail with reference to the accompanying drawings such that those of ordinary skill in the art can easily implement the disclosure. Detailed descriptions of parts in the accompanying drawings, which are not related to the disclosure, may be omitted to make the disclosure clear. Also, in the drawings, the same reference numerals refer to the same components, and overlapping descriptions thereof may be omitted.

FIG. 1 illustrates a situation in which a base station supports Internet communication according to an embodiment of the present application.

With reference to FIG. 1, the vehicle 1 according to an embodiment may include a telematics terminal 100.

The telematics terminal 100 may mean a terminal dedicated to telematics and may be implemented in an audio, video and navigation (AVN) device of the vehicle 1 in an integrated form.

The telematics terminal 100 may communicate with the server 3 through the base station 2 of a mobile carrier.

The base station 2 of the mobile carrier may support various radio access systems such as code division multiple access (CDMA), frequency division multiple access (FDMA), time division multiple access (TDMA), orthogonal frequency division multiple access (OFDMA), and single carrier frequency division multiple access (SCFDMA) CDMA may be implemented with a radio technology such as Universal Terrestrial Radio Access (UTRA) or CDMA2000. TDMA may be implemented with a radio technology such as Global System for Mobile communications (GSM), General Packet Radio Service (GPRS), or Enhanced Data Rates for GSM Evolution (EDGE). OFDMA may be implemented with a radio technology such as Institute of Electrical and Electronics Engineers (IEEE) 802.11 Wireless-Fidelity (Wi-Fi), IEEE 802.16 Worldwide Interoperability for Microwave Access (WiMAX), IEEE 802-20, Evolved UTRA (E-UTRA), or the like. UTRA is part of the Universal Mobile Telecommunications System (UMTS).

$3^{rd}$ Generation (3G) communication standardized by the $3^{rd}$ Generation Partnership Project 2 (3GPP2) corresponds to CDMA2000 and uses 1.5 MHz bandwidth carriers.

3G communication standardized by the $3^{rd}$ Generation Partnership Project (3GPP) corresponds to wideband-cdma (W-CDMA) or UMTS and uses 5 MHz bandwidth carriers.

Long term evolution (LTE) of the 3GPP standard is a part of Evolved UMTS (E-UMTS) using E-UTRA and employs OFDMA in the downlink and SC-FDMA in the uplink. LTE-Advanced (LTE-A) is an evolved version of 3GPP LTE and is called $4^{th}$ Generation (4G) communication to distinguish it from the above-described 3G communication.

4G communication of the 3GPP standard may use 700 MHz to 2.6 GHz bandwidth carriers.

The base station 2 of the mobile carrier may support a plurality of wireless communication networks conforming with a plurality of communication standards.

For example, the base station 2 may support a communication network conforming with the first communication standard (e.g., 3G communication of 3GPP2) and a communication network conforming with the second communication standard (e.g., 4G communication of 3GPP).

According to the policy of the mobile carrier, the base station 2 may employ only the more advanced one, e.g. communication standard supporting higher data rate, of the first and second communication standards with the exclusion of the other.

Accordingly, the base station 2 may stop supporting the communication network conforming with the first communication standard (e.g., 3G communication of 3GPP2) and support only the communication network conforming with the second communication standard (e.g., 4G communication of 3GPP).

The server 3 may mean a telematics server 3 that provides a telematics service to the vehicle 1. However, the present disclosure is not limited thereto, and the server 3 may mean a call center server and, in this case, the call center server may place a call to the user terminal 4 according to a request from the telematics terminal 100.

The server 3 may communicate with the telematics terminal 100 of the vehicle 1 to provide the driver in real time with vehicle accident or theft detection, driving route guidance, traffic and living information, remote vehicle diagnosis service, financial service, game, and the like.

The telematics terminal 100 may communicate with the server 3 through Internet communication and/or SMS communication.

For example, the telematics terminal 100 may perform Internet communication with the server 3 over the communication network of the base station 2. Also, the telematics terminal 100 may perform SMS communication with the server 3 over the communication network of the base station 2.

The user terminal 4 may include a driver terminal, a first user terminal, and a second user terminal. That is, there is no limit to the number of user terminals 4.

The user terminal 4 may communicate with the telematics terminal 100 of the vehicle 1 to provide the driver in real time with vehicle accident or theft detection, driving route guidance, traffic and life information, remote vehicle diagnosis service, financial service, game, etc.

For example, the telematics terminal 100 may perform Internet communication, SMS communication, and telephony communication with the user terminal 4 over the communication network of the base station 2. Here, the telephony communication may be, for example, plain old telephone service (POTS), integrated services digital network (ISDN), voice over Internet protocol (VoIP), and mobile communication network-based telephony, but is not limited thereto.

The user terminal 4 may include, for example, all types of input/output-capable wired/wireless communication devices such as a smartphone, a smart pad, a tablet personal computer (PC), a laptop computer, a wearable device, and a digital signage, but is not limited thereto. That is, it may be understood that a vehicle remote control device can be applied to the user terminal 4 by way of example.

Figure 2:
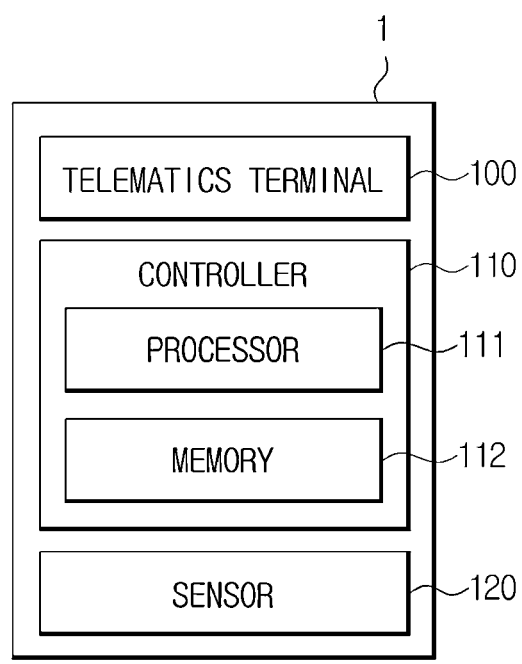
FIG. 2 is a block diagram illustrating a configuration of a vehicle according to an embodiment.

FIG. 2 is a block diagram illustrating a configuration of a vehicle according to an embodiment.

With reference to FIG. 2, a vehicle 1 may include a telematics terminal 100, a controller 110, and a sensor 120.

The telematics terminal 100 may include a communication module for communication with the server 3. The controller 110 may include a memory 112 storing software for controlling the communication module, and a processor 111 controlling the communication module based on the software stored in the memory 112.

The telematics terminal 100 is configured to include a communication module (e.g., a communication modem) to communicate with the server 3. Here, the communication module may provide a 4G communication function such as LTE as well as a 2nd generation (2G) or 3G communication function. That is, the telematics terminal 100 may communicate with the server 3 through the base station 2 of a mobile carrier.

The telematics terminal 100 may transmit various data to the server 3 and receive various data from the server 3.

The communication module provided in the telematics terminal 100 may include a module necessary for mobile communication. For example, a communication module may include, but is not limited to, a module conforming with a 3G communication standard of 3GPP2 and/or a module conforming with a 3G communication standard of 3GPP and/or a module conforming with a 4G communication standard of 3GPP. That is, the communication module of the telematics terminal 100 may include a module necessary for a communication network to be used.

That is, the communication module may provide not only the functions for 3G and 4G networks conforming with the current communication standards but also the functions required for communication networks, e.g., including 5G networks, under discussion in the international standards organizations.

The communication module may be connected to an integrated antenna mounted on the vehicle 1 and may transmit and receive wireless signals to and from a mobile communication network through the integrated antenna. Data processed by the communication module may be transmitted to the processor 111 or a mobile communication network connected through an integrated antenna.

The communication module may also be provided with an interface capable of communicating with the user terminal. In this case, the communication module may communicate with the user terminal through Wi-Fi, Bluetooth, or the like but without limitation thereto.

According to various embodiments, the communication module may perform SMS communication based on the SMS number of the server 3 stored in the memory 112.

Meanwhile, the communication module of the telematics terminal 100 may include a memory for storing a program and data for use in performing modulation/demodulation, and a processor for performing modulation/demodulation of a communication signal according to the program and data stored in the memory. Accordingly, the communication module may transmit and receive a low frequency (LF) signal, a radio frequency (RF) signal, and an ultra-wideband signal to and from the remote control device and/or the user terminal 4 for a unique identifier (ID) information checking procedure or exchange of control signals related to the vehicle.

The communication module may transmit a search signal periodically. Here, the search signal refers to a communication signal transmitted by the vehicle 1 around the vehicle 1 (within a communication distance) to determine whether the remote control device and/or the user terminal 4 is within a communication range from the vehicle 1.

The communication module may include a communication interface including a communication port connecting a corresponding network and a receiver receiving a communication signal according to at least one of an ultra-wideband (UWB) communicator, a Bluetooth low energy (BLE) communicator, a near-field communication (NFC) unit, a low frequency (LF) communicator, and radio frequency (RF) communicator included in the communication module. In addition, the communication module may further include a communication signal conversion module that demodulates the communication signal received through the communication interface into a control signal under the control of the controller 110.

The communication module may receive a search response signal from the remote control device and/or the user terminal 4 in response to the search signal of the vehicle 1. The search response signal refers to a communication signal transmitted from the remote control device to the vehicle 1 to acknowledge to the vehicle 1 that the remote control device has received the search signal from the vehicle 1.

As described above, the communication signal, i.e., the search signal for searching the remote control device and/or the user terminal 4 and the search response signal, may be transmitted in a different format according to at least one of the UWB, BLE, NFC, RF, and LF communicators included in the communication module.

Meanwhile, the search signal and the search response signal may have, for example, different formats.

Meanwhile, the communication module may include at least one antenna (not shown) for use in communication with the remote control device and/or the user terminal 4. Here, it can be understood that the antenna (not shown) may be a receiver included in the communication interface as described above.

In addition, the communication module may transmit a communication signal exchanged with the remote control device and/or the user terminal 4 to the controller 110 and/or the ECU of the vehicle 1.

Accordingly, the vehicle 1 may identify the location of the remote control device and/or the user terminal 4 based on the communication data including the search signal and the search response signal from the communication module.

In more detail, the controller 110 may more accurately identify the location of the remote control device based on the search signal and the search response signal received from the communicator using frequency bands each included in the communication module. In another embodiment, considering that the ultra-wideband (UWB) communication is limited as the distance increases even with low power consumption, high-speed communication capability, and high position detection accuracy, the communication via the UWB communicator for the case where the communication distance between the vehicle 1 and the remote control device is close may be switched to communication via the BLE communicator for the case where the communication distance becomes longer.

Accordingly, the controller 110 may determine the location of the remote control device using a Time of Flight (ToF) method with respect to the signal received from the remote control device through the communication module. In another embodiment, the controller 110 may determine the location of the remote control device using a time of arrival (TOA), time difference of arrival (TDOA), angle of arrival (AOA), or received signal strength indicator (RSI) method.

The vehicle 1 may include a controller 110 including at least one processor 111 executing a program performing the above-described operations and operations to be described later and/or a stored program and at least one memory 112 storing the program performing the above-described operations and the operations to be described later.

The at least one memory 112 may store various data necessary for the operation of the telematics terminal 100. The memory 112 may store an operating system necessary for operating the telematics terminal 100 or various applications necessary for providing information.

The memory 112 may also store a control program for controlling the telematics terminal 100 (e.g., software for controlling a communication module) and control data for controlling the operation of the telematics terminal 100. The memory 112 may also store operation data generated while the telematics terminal 100 performs a predetermined operation.

The memory 112 may include at least one of storage media including a flash memory, a hard disk, a card-type memory (e.g., SD or XD memory, etc.), a random access memory (RAM), and a static random access memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The at least one processor 111 may control general operations of the telematics terminal 100 based on the control program and control data stored in the memory 112.

The processor 111 may control operations of various modules and devices built in the telematics terminal 100.

For example, the processor 111 may control the communication module based on software stored in the memory 112.

In an embodiment, the processor 111 generates a control signal to control various modules, devices, and/or Electronic Controller (ECU) of the vehicle 1 embedded in the telematics terminal 100 to operate. The processor 111 may also output music or video according to a control command from a user terminal paired with the telematics terminal 100 and control a module installed in the vehicle 1 using information on the user terminal as the user terminal is operated.

Meanwhile, the telematics terminal 100 may include a user interface unit. The user interface unit may include a display for outputting various data and an input unit for receiving various user inputs.

For example, the user interface unit may provide a user interface for updating software of the telematics terminal 100.

In an embodiment, the processor 111 may control the user interface unit to provide a user interface for updating software based on receiving an update request signal from the server 3.

In addition, the processor 111 may control the communication module to transmit a signal requesting update data to the server 3 based on receiving a user input for authorizing software update through the user interface unit.

The processor 111 may update software stored in the memory 112 based on receiving update data from the server 3. Accordingly, the software stored in the memory 112 may maintain the latest version.

That is, the telematics terminal 100 according to an embodiment may update the software through an over-the-air (OTA) method.

According to various embodiments, the user may update the software of the telematics terminal 100 by inserting a universal serial bus (USB) drive, in which the software is stored, into a USB port provided in the vehicle 1.

The sensor 120 may acquire state information of the vehicle 1. Here, the state information may mean, for example, information related to the current state of the vehicle 1. In more detail, the state information may include battery use state information of the vehicle 1.

Accordingly, the sensor 120 may include a battery management device for acquiring the battery use state information of the vehicle 1. For example, the battery management device may include a current sensor, a voltage sensor, and a temperature sensor.

Here, the current sensor may sense the current flowing through the battery. In addition, the voltage sensor may sense the voltage at the output terminal of the battery. In addition, the temperature sensor may sense the temperature of the battery. That is, the battery use state information may include, for example, information on the current flowing through the battery, information on the voltage at the output terminal of the battery, and information on the temperature of the battery.

The sensor 120 may transmit the acquired battery use state information to the controller 110.

Accordingly, the controller 110 may identify and monitor a state of charge (SoC) of the battery based on the current information, voltage information, and temperature information of the battery. Accordingly, the controller 110 may identify the amount of battery consumption per hour based on the state of charge of the battery. That is, the controller 110 may identify the consumption rate of the battery.

The controller 110 may also acquire information on the amount of charge of the battery that corresponds to the current information, voltage information, and temperature information of the battery from a table previously stored in the memory 112. Accordingly, the controller 110 may calculate the expected discharge time of the battery based on the information on the amount of charge of the battery and the consumption rate of the battery. However, the present disclosure is not limited thereto.

The controller 110 may also identify the amount of battery consumption based on processing the battery use state information included in the state information. For example, in the case where the tail lamp is on and the warning lamp is on, the controller 110 may identify the battery consumption of the tail lamp and warning lamp based on processing the battery use state information. In this case, the controller 110 may generate a control signal to turn off the ECU or an electronic device with a large battery consumption amount in response to the battery charge amount being less than a predetermined value. However, the present disclosure is not limited thereto.

Meanwhile, the state information acquired by the sensor 120 may include, for example, information on whether a door of the vehicle 1 is open, whether a side mirror of the vehicle 1 is folded, whether tail lamps are on, whether an emergency lamp is on, whether trunk is open, whether a window is open, and whether a person is present inside the vehicle 1.

To this end, the sensor 120 may include an infrared sensor, a position detection sensor, a fuel sensor, an internal camera, and the like for acquiring state information of the vehicle 1. However, the present disclosure is not limited thereto. Accordingly, it may be understood that the sensor 120 may include a conventionally known sensor and/or a sensor to be developed in the future for acquiring the above-described state information.

The controller 110 may process the state information received from the sensor 120. Accordingly, the controller 110 may identify the driver's getting-off state of the vehicle 1 based on processing the state information. For example, the getting-off state of the vehicle 1 may mean that no one is present inside the vehicle 1 and the ignition is off. However, the present disclosure is not limited thereto.

In another embodiment, the controller 110 may identify the driver's getting-off state in response to locating the user terminal 4 far from a predetermined distance or longer outside the vehicle 1 based on the communication between the communication module included in the telematics terminal 100 of the vehicle 1 and the user terminal 4.

Meanwhile, the controller 110 may generate a control signal to transmit a warning message corresponding to the state information from the sensor 120 to the driver terminal in response to the identification of the driver getting-off state.

Meanwhile, the controller 110 may determine the battery use state of the vehicle 1 in response to the identification of the driver getting-off state. In more detail, the controller 110 may generate a control signal for requesting the state information of the vehicle 1 from the sensor 120 in response to the identification of the driver getting-off state. Accordingly, the controller 110 may obtain the battery use state information included in the state information and determine the battery use state.

That is, the controller 110 may determine the battery use state including the type of the ECU or electronic device consuming battery power, such as on-state tail lamps and on-state warning lamps of the vehicle 1, based on processing the state information.

The controller 110 may generate a control signal based on the battery use state in order for the communication module to transmit a warning message to the driver terminal. In more detail, the controller 110 may generate a control signal, in response to the battery use state indicating that the tail lamps of the vehicle 1 are on, to transmit a message warning that the tail lamps of the vehicle 1 are on to the driver terminal.

Meanwhile, the warning message may further include, for example, information on the expected battery discharge time, which is identified based on processing the battery use state information obtained by the controller 110 from the sensor 120.

The controller 110 may also generate a control signal to transmit the warning message to a predetermined terminal in response to failing receipt of a response to the warning message transmitted to the driver terminal within a predetermined time. Here, the predetermined terminal may refer to a contact information of the terminal input in advance by the user through the user interface unit. For example, the predetermined terminal, although it may be changed according to a user input, may mean contact information for the user's family. Here, the response to the message may include, for example, a control signal indicative of removing a cause of the warning message or a control signal indicative of not receiving the warning since then. However, the present disclosure is not limited thereto.

Meanwhile, the controller 110 generates a control signal to place a call to the driver terminal in response to the battery use state not being changed before a predetermined time based on the identified expected discharge time. Here, placing a call to the driver terminal may mean placing a telephone call.

For example, if the predetermined time is 1 hour, the controller 110 may generate a control signal to place a call to the driver terminal, in response to the battery use state not being changed due to the failure of receipt of a response from the driver terminal until 2 hours, which is 1 hour earlier than 3 hours of the identified discharge estimate time. Meanwhile, that the battery use state is not being changed may mean that the battery consumption rate and/or the expected discharge time of the battery is not changed. That is, this means the unnecessary battery use state of the vehicle 1 is not changed.

The controller 110 may generate a control signal for requesting history information of the vehicle 1 from the server 3 in response to failure of receipt of a response from the driver terminal within the predetermined time. Here, the history information may mean information including a history of the vehicle 1. In more detail, the history information may include, for example, the location sharing of the vehicle 1 and/or the details of terminal information shared by the smart key (or remote control device) and/or the details of terminals connected to the vehicle 1 via Bluetooth.

Accordingly, the controller 110 may identify the first user terminal based on processing the history information. Here, the first user terminal may be a terminal identified based on at least one of the number of sharing times of the location of the vehicle 1 and/or the number of sharing times of the smart key of the vehicle 1 by the telematics terminal 100 among the terminals included in the history information. That is, the controller 110 may identify the first user terminal that is a terminal having a high possibility of communication by the driver of the vehicle 1, based on processing the history information. However, the present disclosure is not limited thereto. That is, as described above, it can be understood that the first user terminal may be predetermined by the driver.

Meanwhile, the controller 110 may generate a control signal to transmit a warning message to the identified first user terminal in response to the failure of receipt of a response to a call and/or warning message transmitted to the driver terminal within a predetermined time and/or before a time predetermined based on the expected discharge time. Meanwhile, transmitting the warning message may be replaced with, for example, generating a control signal to attempt a voice call.

Meanwhile, the controller 110 may generate a control signal to transmit a warning message to the identified first user terminal only in the case where there is state information indicative of a probability of battery discharge and/or theft of the vehicle 1. For example, in the case where the state information indicative of only the unfolded state of the side mirror of the vehicle 1 is received from the sensor 120, the controller 110 may not separately transmit a warning message to the first user terminal even if, after transmitting the warning message to the driver terminal, no response to the warning message is received within a predetermined time. However, the present disclosure is not limited thereto.

Thereafter, the controller 110 may identify the second user terminal in response to failure of receipt of a response to the warning message transmitted to the first user terminal within a predetermined time. In more detail, the controller 110 may identify the second user terminal based on the number of Bluetooth connections with the vehicle 1 among the terminal information obtained by processing the history information in response to failure of receipt of the response to the warning message transmitted to the first user terminal within a predetermined time.

Accordingly, the controller 110 may generate a control signal to identify the second user terminal and transmit a warning message to the second user terminal in response to the failure of receipt of the response to the warning message transmitted to the first user terminal within a predetermined time.

Meanwhile, it can be understood that controlling, by the controller 110, to transmit the warning message to the first user terminal and/or the second user terminal may be changed in order. It may also be possible for the controller 110 to generate a control signal to transmit a warning message to both the first and second user terminals.

Meanwhile, in response to the failure of receipt of a response to the warning message transmitted to the second user terminal within a predetermined time, the controller 110 may identify the battery consumption amount based on processing the battery use state information. Accordingly, the controller 110 may generate a control signal to turn off the ECU or the electronic device having a large battery consumption amount in response to a battery charge amount less than a predetermined value. However, the present disclosure is not limited thereto.

In another embodiment, the controller 110 may generate a control signal to transmit a guidance message to the driver terminal and/or the first user terminal and/or the second user terminal in response to the failure of receipt of a response to the warning message sent to the second user terminal within a predetermined time. Here, the guidance message may refer to, for example, information on the expected battery discharge time and/or a guidance on how to deal with the discharging of the vehicle 1. However, the present disclosure is not limited thereto.

Meanwhile, the controller 110 may request history information of the vehicle 1 from the server 3. In more detail, in response to determining the battery use state of the vehicle 1, the controller 110 may request history information of the vehicle 1 to the server 3 in the case where the battery use state is indicative of a state where the battery power is in use such as a warning lamp on-state.

Here, the history information may include, for example, a history in which the telematics terminal 100 transmits a warning message to the user terminal 4, a call history, a warning message, and/or a history of response to a call.

The controller 110 may identify driver propensity information based on the received history information. In more detail, the controller 110 may identify the driver propensity information based on at least one of the number of times of receipt of a warning message, number of times of receipt of a call, and number of times of responses thereto. For example, in the case where the driver receives a warning message, the driver propensity information may mean a propensity for content in the response to the message. That is, in the case where the driver receives a warning message, the response to the message may mean the driver's propensity to generate a control signal for preventing battery consumption.

For example, the controller 110 may calculate a score based on the number of generations of warning messages and the number of responses for generating a control signal to prevent battery consumption and, in the case where the score is greater than a predetermined value, generate a control signal corresponding to the state information of the vehicle 1 rather than separately generating a control signal to transmit a warning message.

For example, in the case where the driver receives a warning message 50 times and all responses to 50 warning messages are related to a signal to control the switching off of the battery consumption state, the controller 110 may generate a control signal to control the switching off of the battery consumption state rather than a control signal to transmit a separate user warning message. However, the present disclosure is not limited thereto.

Meanwhile, in response to the warning message to the driver terminal being greater than a predetermined number of times, the controller 110 may identify driver propensity information and generate a control signal corresponding to a battery use state based on the driver propensity information. It can be understood that this may also be applicable to such a case as unfolded state of a side mirror that is not related to the battery use state.

Meanwhile, the telematics terminal 100 may include a communication module communicating with a server, a memory storing software for controlling the communication module, and a processor controlling the communication module based on the software stored in the memory.

Here, as for the memory included in the telematics terminal 100, the same description made to the memory 112 of the vehicle 1 may be applicable. In addition, it can be understood that the same description made to the processor 111 of the vehicle 1 may be applicable to the processor included in the telematics terminal 100.

That is, it can be understood that the telematics terminal 100 may perform the above-described operations by itself.

FIGS. 3 to 7 are flowcharts illustrating a vehicle control method according to an exemplary embodiment.

The vehicle control method performed by the telematics terminal 100 and the vehicle 1 including the same may be applied in the same manner as the description of the vehicle 1 or the telematics terminal 100 described above. Accordingly, even if omitted below, the description of the vehicle 1 or the telematics terminal 100 may be equally applied to the vehicle control method or the telematics terminal control method.

Figure 3:
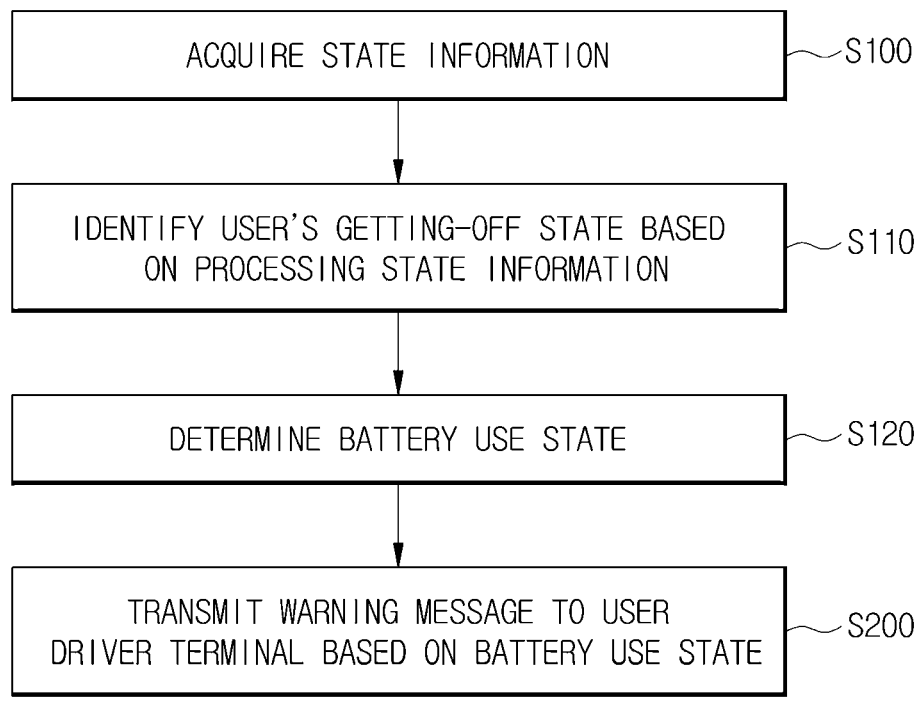
FIGS. 3 to 7 are flowcharts illustrating a vehicle control method according to an exemplary embodiment.

With reference to FIG. 3, the vehicle 1 may obtain state information of the vehicle 1 from the sensor 120 at step S100.

The vehicle 1 may also identify, at step S110, the driver's getting-off state based on processing the state information of the vehicle 1, which is obtained at step S100.

The vehicle 1 may also determine, at step S120, the battery use state based on processing the state information of the vehicle 1, which is obtained at step S100.

The vehicle 1 may also transmit, at step S200, a warning message to the driver terminal based on the battery use state determined at step S120.

Figure 4:
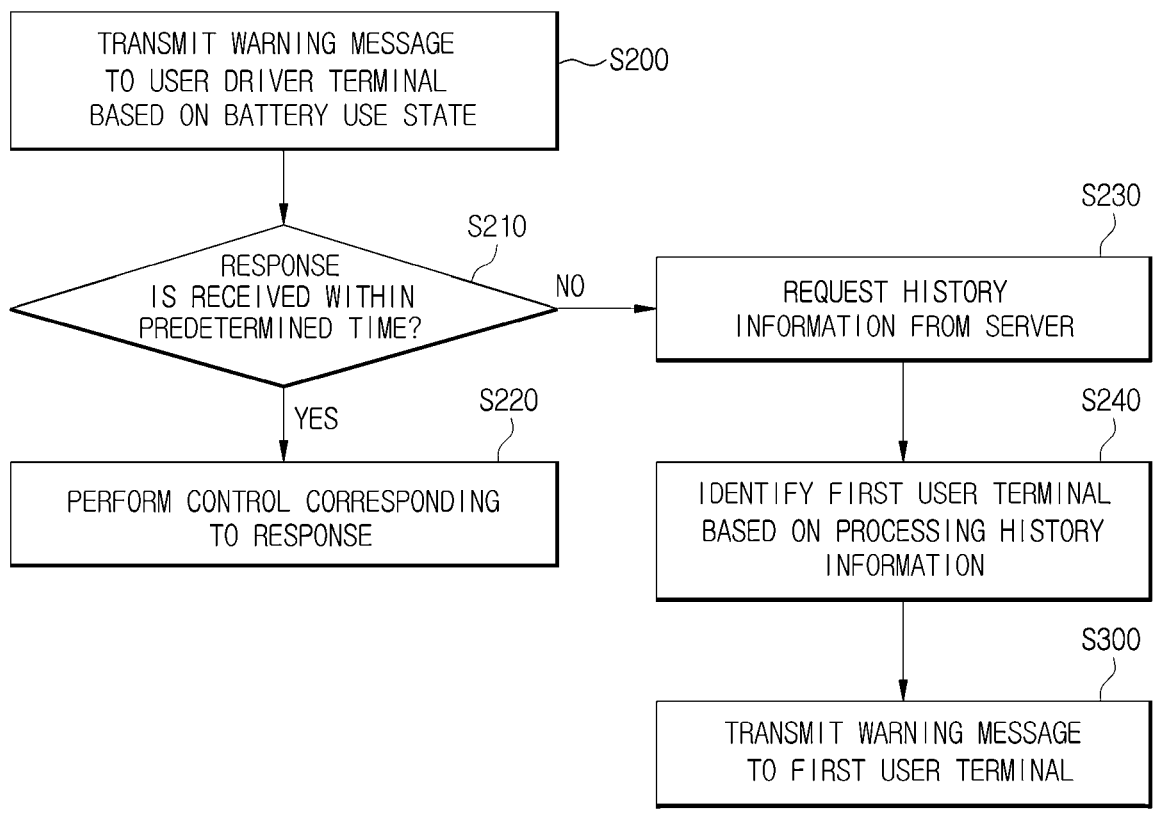

With reference to FIG. 4, the vehicle 1 may transmit, at step S200, a warning message to the driver terminal based on the battery use state determined at step S120.

The vehicle 1 may also determine at step S210 whether a response corresponding to the warning message transmitted to the driver terminal at step S200 is received within a predetermined time.

In this case, in response to receipt of a response within a predetermined time, the vehicle 1 may perform, at step S220, a control corresponding to the received response.

Meanwhile, the vehicle 1 may request, at step S230, history information of the vehicle 1 from the server 3, in response to failure of receipt of a response within a predetermined time.

The vehicle 1 may also process the history information, in response to receipt of the requested history information at step S230, and identify, at step S240, the first user terminal based on processing the history information.

The vehicle 1 may also transmit, at step S300, a warning message to the first user terminal identified at step S240.

Figure 5:
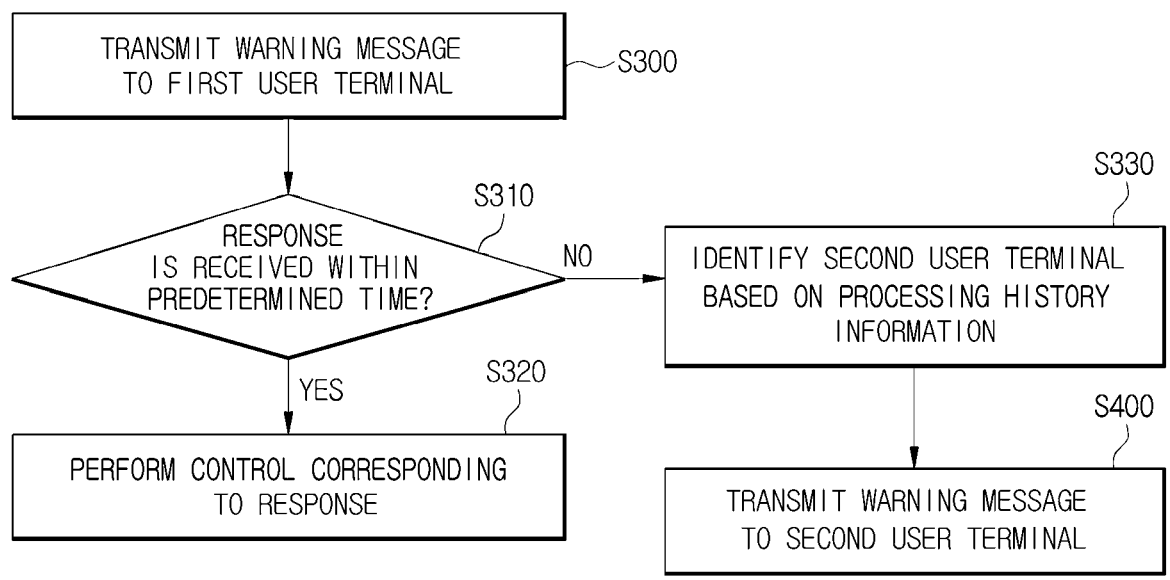

With reference to FIG. 5, the vehicle 1 may transmit, at step S300, a warning message to the first user terminal identified at step S240.

The vehicle 1 may determine at step S310 whether a response corresponding to the warning message transmitted to the first user terminal at step S300 is received within a predetermined time.

In this case, in response to receipt of a response within a predetermined time, the vehicle 1 may perform, at step S320, a control corresponding to the received response.

Meanwhile, in response to failure of receipt of a response within the predetermined time, the vehicle 1 may identify, at step S330, the second user terminal based on processing the history information received at step 230.

The vehicle 1 may also transmit, at step S400, the warning message to the second user terminal identified at step S330.

Figure 6:
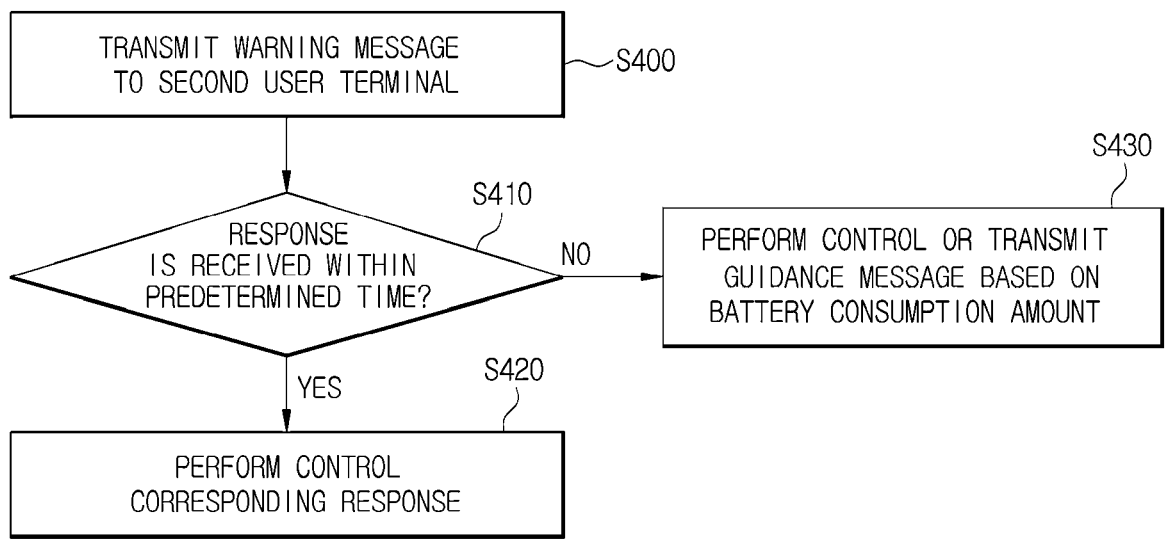

With reference to FIG. 6, the vehicle 1 may transmit, at step S400, the warning message to the second user terminal identified at step S330.

The vehicle 1 may also determine at step S410 whether a response corresponding to the warning message transmitted to the second user terminal at step S400 is received within a predetermined time.

In this case, in response to receipt of a response within a predetermined time, the vehicle 1 may perform, at step S420, a control corresponding to the received response.

Meanwhile, in response to failure of receipt of a response within the predetermined time, the vehicle 1 may perform, at step S430, a control based on the battery consumption amount obtained based on processing, by the vehicle 1, transmit a guidance message to the driver terminal and/or the first user terminal and or the second user terminal.

Figure 7:
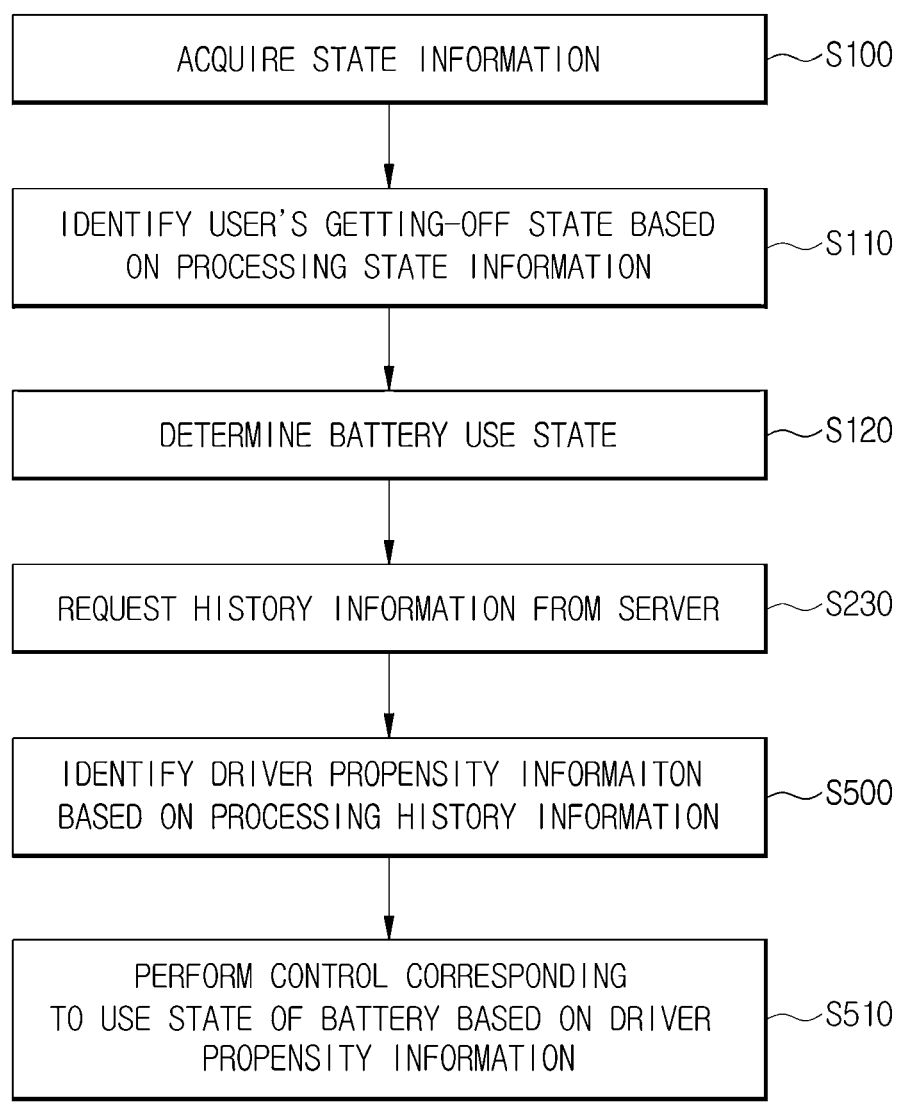

With reference to FIG. 7, the vehicle 1 may obtain state information of the vehicle 1 from the sensor 120 at step S100. The vehicle 1 may also identify, at step S110, the driver's getting-off state based on the processing of the state information. The vehicle 1 may also determine, at step S120, the battery use state based on processing the state information.

In this case, the vehicle 1 may request, at step S230, the history information of the vehicle 1 from the server 3.

The vehicle 1 may also identify, at step S500, driver propensity information based on processing the received history information.

The vehicle 1 may perform, at step S510, a control corresponding to the battery use state based on the driver propensity information.

According to the present disclosure, it is possible to prevent the battery of a vehicle from being discharged by providing a means for calling the attention of the driver who receives a warning message but does not respond to the warning message, resulting in improvement of user convenience.

Meanwhile, some components of the telematics terminal 100 and the vehicle 1 may be software and/or hardware components such as Field Programmable Gate Array (FPGA) and Application Specific Integrated Circuit (ASIC).

Meanwhile, the disclosed embodiments may be implemented in the form of a recording medium storing instructions executable by a computer. The instruction may be stored in the form of a program code, and when executed by a processor, a program module may be generated to perform operations of the disclosed embodiments. The recording medium may be implemented as a computer-readable recording medium.

The computer-readable recording medium includes any type of recording medium in which instructions readable by the computer are stored. For example, there may be a read-only memory (ROM), a random access memory (RAM), a magnetic tape, a magnetic disk, a flash memory, an optical data storage device, and the like.

The disclosed embodiments have been described as above with reference to the accompanying drawings. Those skilled in the art will understand that the present disclosure may be implemented in a form different from the disclosed embodiments without changing the technical spirit or essential features of the present disclosure. The disclosed embodiments are illustrative and should not be construed as limiting.

What is claimed is:

1. A vehicle comprising:
   a sensor configured to acquire state information of the vehicle;
   a telematics terminal configured to communicate with a server; and
   a controller comprising a processor configured to process the state information,
   wherein the controller is configured to identify driver's getting-off state of the vehicle based on processing the state information, determine use state of a battery of the vehicle in response to identifying the driver's getting-off state, and generate a control signal to transmit a first warning message to a driver terminal based on the use state of the battery, and wherein the controller is further configured to request history information of the vehicle from the server in response to failure of receipt of a response from the driver terminal within a predetermined time, identify a first user terminal based on processing terminal information included in the history information, and generate a control signal to transmit a third warning message to the identified first user terminal, and wherein the identifying of the first user terminal comprises identifying the first user terminal based on at least one of a number of location sharing times of the vehicle and a number of smart key sharing times of the vehicle via the telematics terminal among terminal information included in the history information.

2. The vehicle of claim 1, wherein the controller is further configured to identify an expected discharge time of the battery based on the use state of the battery and generate a control signal to contact the driver terminal in response to the use state not being changed before a time predetermined based on the expected discharge time.

3. The vehicle of claim 1, wherein the controller is further configured to generate a control signal to transmit a second warning message to a predetermined terminal in response to failure of receipt of a response from the driver terminal within a predetermined time.

4. The vehicle of claim 1, wherein the controller is further configured to generate, in response to receipt of a response to the third warning message, a control signal corresponding to the response.

5. The vehicle of claim 4, wherein the third warning message is a warning message about at least one of tail lamp on-state, emergency lamp on-state, and ignition on-state.

6. The vehicle of claim 1, wherein the controller is further configured to identify a second user terminal in response to failure of receipt of a response from the first user terminal within the predetermined time and generate a control signal to transmit a fourth warning message to the identified second user terminal.

7. The vehicle of claim 6, wherein the identifying of the second user terminal comprises identifying the second user terminal based on a number of Bluetooth connections to the vehicle among terminal information included in the history information.

8. The vehicle of claim 1, wherein the controller is configured to request history information of the vehicle from the server, identify driver propensity information based on the history information of the vehicle, and generate a control signal corresponding to the use state of the battery based on the identified driver propensity information.

9. A telematics terminal in a vehicle, the telematics terminal comprising:
a communication module configured to communicate with a server;
a memory configured to store software for controlling the communication module; and
a processor configured to control the communication module based on the software stored in the memory,
identify driver's getting-off state of the vehicle based on processing a state information, determine use state of a battery of the vehicle in response to identifying the driver's getting-off state, and generate a control signal to control the communication module to transmit a warning message to a driver terminal based on the use state of the battery, wherein the processor is further configured to request history information of the vehicle from the server in response to failure of receipt of a response from the driver terminal within a predetermined time, identify a first user terminal based on processing terminal information included in the history information, and generate a control signal to transmit a third warning message to the identified first user terminal, and wherein the identifying of the first user terminal comprises identifying the first user terminal based on at least one of a number of location sharing times of the vehicle and a number of smart key sharing times of the vehicle via the telematics terminal among terminal information included in the history information.

10. A method of controlling a vehicle, the method comprising:
acquiring, by a sensor, state information of the vehicle;
identifying, by a controller, driver's getting-off state of the vehicle based on processing the state information;
determining, by the controller, battery use state of the vehicle in response to identifying the driver's getting-off state of the vehicle; and
transmitting, by the controller, a first warning message to a driver terminal based on the battery use state;
requesting, by the controller, history information of the vehicle from a server in response to failure of receipt of a response from the driver terminal within a predetermined time;
identifying, by the controller, a first user terminal based on processing terminal information included in the history information; and
transmitting, by the controller, a third warning message to the identified first user terminal,
wherein the identifying of the first user terminal comprises identifying, by the controller, the first user terminal based on at least one of a number of location sharing times of the vehicle and a number of smart key sharing times of the vehicle via a telematics terminal among terminal information included in the history information.

11. The method of claim 10, further comprising:
identifying, by the controller, an expected discharge time of a battery; and
contacting, by the controller, the driver terminal in response to the battery use state not being changed before a time predetermined based on the expected discharge time.

12. The method of claim 10, further comprising transmitting, by the controller, a second warning message to a predetermined terminal in response to failure of receipt of a response from the driver terminal within a predetermined time.

13. The method of claim 10, further comprising performing, by the controller, in response to receipt of a response to the third warning message, a control corresponding to the response.

14. The method of claim 13, wherein the third warning message is a warning message about at least one of tail lamp on-state, emergency lamp on-state, and ignition on-state.

15. The method of claim 10, further comprising:
identifying, by the controller, a second user terminal in response to failure of receipt of a response from the first user terminal within the predetermined time; and
transmitting, by the controller, a fourth warning message to the identified second user terminal.

16. A computer-readable recording medium causing a computer to execute a process comprising:

acquiring state information of a vehicle;
identifying driver's getting-off state of the vehicle based on processing the state information;
determining battery use state of the vehicle in response to identifying the driver's getting-off state of the vehicle;
transmitting a warning message to a driver terminal based on the battery use state;
requesting history information of the vehicle from a server in response to failure of receipt of a response from the driver terminal within a predetermined time;
identifying a first user terminal based on processing terminal information included in the history information; and
transmitting a third warning message to the identified first user terminal,
wherein the identifying of the first user terminal comprises identifying, by a controller, the first user terminal based on at least one of a number of location sharing times of the vehicle and a number of smart key sharing times of the vehicle via a telematics terminal among terminal information included in the history information.

* * * * *